United States Patent [19]
White

[11] Patent Number: 5,680,250
[45] Date of Patent: Oct. 21, 1997

[54] VIEWING ASSEMBLY INCLUDING PRISMS AND MIRRORS ROTATABLE ABOUT AXES TRANSVERSE TO THE LINE OF SIGHT

[75] Inventor: Peter White, Doncaster, Australia

[73] Assignee: Salwin Pty. Ltd., Australia

[21] Appl. No.: 557,812

[22] Filed: Nov. 14, 1995

[30] Foreign Application Priority Data

Nov. 14, 1994 [AU] Australia ................. PM9431

[51] Int. Cl.⁶ .............. G02B 27/24; G02B 23/18; G02C 1/00
[52] U.S. Cl. .............. 359/479; 359/471; 359/482; 351/158
[58] Field of Search ................. 359/478, 479, 359/480, 482, 477, 471, 465, 463, 894; 351/203, 158

[56] References Cited

U.S. PATENT DOCUMENTS

| | | | |
|---|---|---|---|
| 2,295,243 | 9/1942 | Steinman | 359/471 |
| 2,528,673 | 11/1950 | Taylor | 351/158 |
| 3,010,356 | 11/1961 | Wilson | 359/480 |
| 3,460,530 | 8/1969 | Lorenz | 351/203 |
| 3,523,375 | 8/1970 | Frith et al. | 359/480 |
| 3,586,414 | 6/1971 | Schultz | 359/471 |
| 4,457,584 | 7/1984 | Pryor | 359/477 |
| 4,568,970 | 2/1986 | Rockstead | 359/471 |
| 4,810,057 | 3/1989 | Dunkley | 359/480 |
| 4,929,075 | 5/1990 | Eliakim | 359/480 |

FOREIGN PATENT DOCUMENTS

| | | | |
|---|---|---|---|
| 1965760 | 7/1971 | France | 359/478 |
| 556927 | 2/1957 | Italy | 359/479 |
| 908319 | 10/1962 | United Kingdom | 349/482 |
| 626447 | 7/1969 | United Kingdom | 359/480 |
| 1499755 | 2/1978 | United Kingdom | 359/482 |
| 217006 | 6/1996 | United Kingdom | 359/480 |

*Primary Examiner*—Jon W. Henry
*Attorney, Agent, or Firm*—Michael D. Bednarek; Kilpatrick Stockton LLP

[57] ABSTRACT

A viewing assembly for viewing a two dimensional object in three dimensions is disclosed which has vision directing means for converging the lines of sight of a user of the viewing assembly to direct the sight of each eye of the user to predetermined segments of an object being viewed, the predetermined segments being laterally spaced and partially overlapping, the angle of convergence of the lines of sight being such that the lines of sight of each eye intersect at a point between the eyes and the object whereby a segment to the left of the object is viewed by the right eye and a segment to the right of the object is viewed by the left eye. A method of ocular therapy is also disclosed wherein the vision of a patient is conditioned by viewing an object using the viewing assembly.

8 Claims, 6 Drawing Sheets

VIEWING ASSEMBLY INCLUDING PRISMS AND MIRRORS ROTATABLE ABOUT AXES TRANSVERSE TO THE LINE OF SIGHT

This invention relates to a viewing assembly.

This invention has particular but not exclusive application to the viewing of two-dimensional objects such as a television screen, photographs and paintings.

The stereoscopic effect or stereopsis is well known. The effect gives the perception of depth arising as a result of binocular vision. The adult human eyes are separated by a distance of between about 58 and 72 mm and consequently when an object is viewed with both eyes, the direction and orientation of the object for each eye is slightly different and so the two retinal images are not in exactly the same position or of exactly the same orientation. The images differ slightly because one eye sees a portion of one side of the object and the other eye sees a portion of the other side. Because of these differences, humans perceive relative distance and subconsciously estimate the form/shape of an object.

This stereoscopic effect may be used when viewing two-dimensional objects to give the effect of depth or a three-dimensional perception. For example, a stereoscopic camera has two objectives separated by some suitable distance and simultaneously takes two photographs of an object from slightly different points of view. These photographs represent the views which would have been apparent for each separate eye had they been looking at the object. When placed in a stereoscope, these two views are superposed, each eye looking at its own view only, and thereby a solid three-dimensional picture is obtained.

The practical application of stereopsis is, however, limited because the images produced by a stereoscopic camera must generally be viewed using apparatus such as a stereoscope to attain the desired effect. Alternatively, the two photographs may be superposed in complimentary colours such as green and red and viewed through glasses of similar lens colour for the right and left eyes respectively. However, if the pictures are viewed with the naked eye, they will resemble a poorly taken photograph.

The present invention aims to provide a viewing assembly which will be reliable and efficient in use and which will allow a user to perceive depth or three dimensions when viewing two-dimensional objects end which will accentuate the three-dimensional effect produced by conventional optical systems such as binoculars for both close and long range use.

This invention in one aspect resides broadly in a viewing assembly which includes;

vision directing means adapted to converge the lines of sight of a user of the viewing assembly and to direct the sight of each eye of the user to predetermined segments of an object being viewed, the predetermined segments being laterally spaced and partially overlapping, the angle of convergence of the lines of sight being such that the lines of sight of each eye intersect at a point between the eyes and the object whereby a segment to the left of the object is viewed by the right eye and a segment to the right of the object is viewed by the left eye.

The predetermined segments may be any suitable segments of the object. However, it is preferred that the predetermined segments constitute substantially two thirds of the object whereby the segments seen by the eyes overlap in substantially the middle third of the object.

Vision directing means as referred to herein includes any means which directs vision including, for example, a pair of tubes or an optical system.

The vision directing means may take many forms and could for example include optical fibres and the like. In one embodiment the vision directing means include longitudinally extending optical passages. It is further preferred that the optical passages are symmetrical about a longitudinally extending axis. The optical passages can for example have a square cross-sectional shape, or can be rectangular, circular or elliptical although other suitable cross-sectional shapes can be used. In a preferred embodiment the respective axes of symmetry of the longitudinally extending optical passageways are inclined at the above-mentioned angle of convergence. Alternatively the outermost walls or edges of the optical passageways may he inclined at the above-mentioned angle of convergence.

Preferably the vision directing means of the assembly includes two tubes which are between about 60 and 90 mm in length and converge at an angle of preferably between about 4°40' and 6°00', although an angle of convergence outside these limits and which allows a user to perceive depth or three dimensions when viewing a two-dimensional object is also contemplates. Optimally, the two tubes converge at an angle of 5°22'.

In a preferred embodiment the optical passages have entrance and exit apertures respectively constituting entrance and exit pupils of the viewing assembly, although it will be understood that the viewing assembly may also include a lens system or other optical systems for enlarging, enhancing or otherwise modifying the image.

As used herein the term "entrance pupil" means an opening which represents the common base of all the cones of light entering the viewing assembly and the term "exit pupil" means an opening which represents the common base of all the cones of light emerging from the viewing assembly and toward the eyes of the viewer.

The entrance and exit pupils may be of any shape but are preferably shaped proportionally to the shape of the two-dimensional object being viewed as this is believed to enhance the effect created by the viewing assembly by isolating the user's field of vision to the object being viewed. In a preferred embodiment the shape of the entrance and exit pupils is substantially rectangular.

It is also preferred that the exit pupils of the assembly be separated by a distance equivalent to the interpupillary distance of the viewer. This distance may be a set distance on an individual assembly or, alternatively, means for adjusting the distance between the exit pupils may be incorporated. This adjustment means may be, for example, a central hinge which may optionally be provided with a scale for indicating the actual interpupillary distance of the setting.

The viewing assembly of the invention may also include positioning means for positioning the assembly in the correct position relative to the viewers eyes. The positioning means may be of any form but preferably includes a spectacle-type arrangement comprising arms which are positioned over the ears of the wearer and a bridge which is positioned over the nose. Altenatively the positioning means may constitute a helmet or like headwear.

The viewing assembly may also include adjustment means for selectively varying the angle of convergence of the sight guiding means.

In another aspect this invention resides broadly in a method of ocular therapy, the method including:

conditioning the vision of a patient by the patient viewing an object using a viewing assembly as defined above.

In order that this invention may be more easily understood and put into practical effect, reference will now be made to the accompanying drawings which illustrate a preferred embodiment of the invention, wherein.

Figure 1:
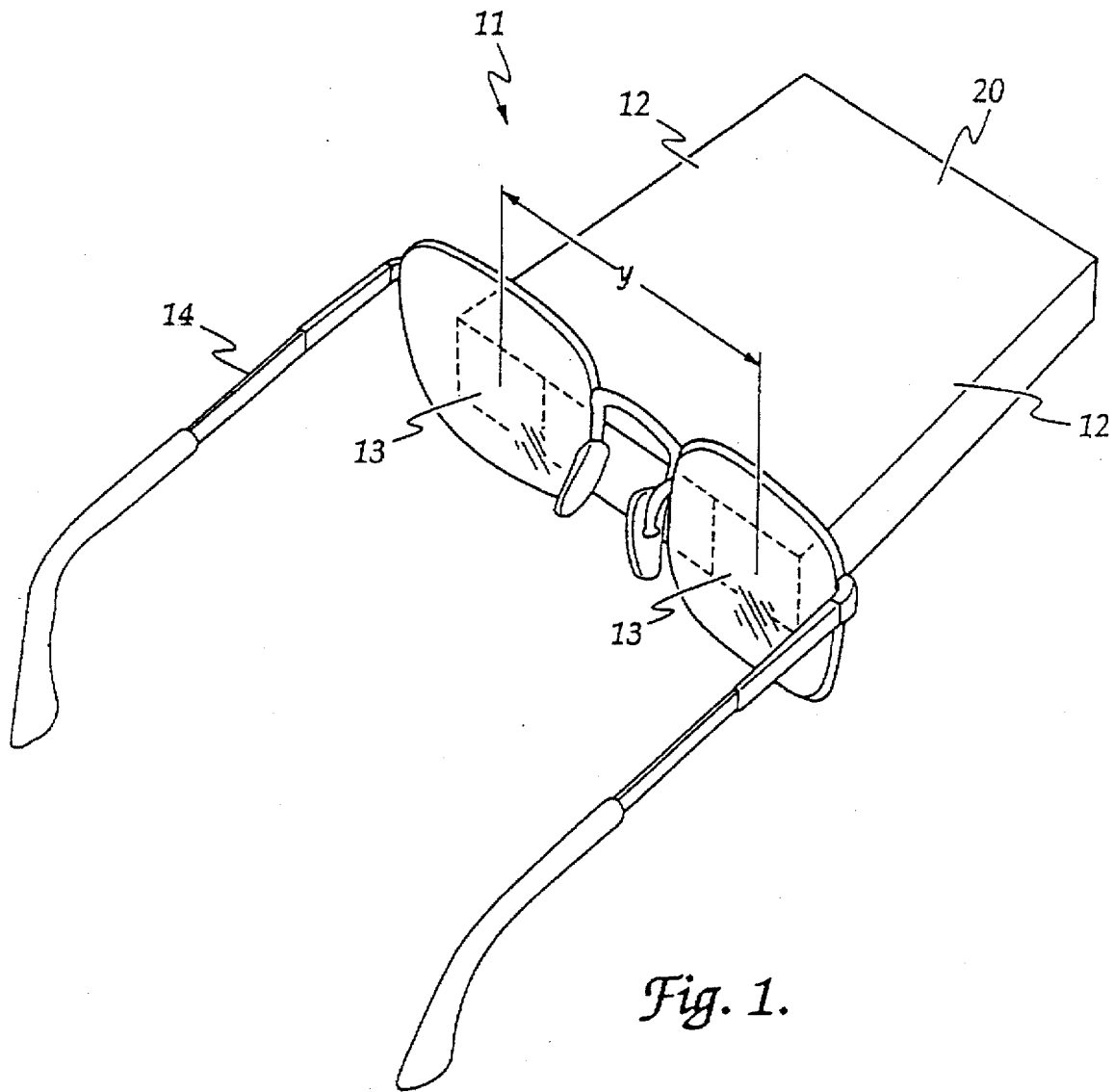
FIG. 1 is a perspective view of the viewing assembly of the invention.
Figure 2B:
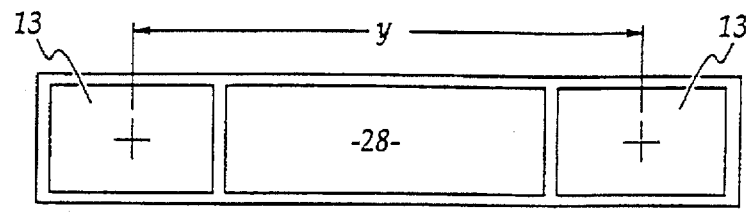
FIGS. 2A–2D illustrate a plan view, rear view and front view and another plan view respectively of the viewing assembly.
Figure 2A:
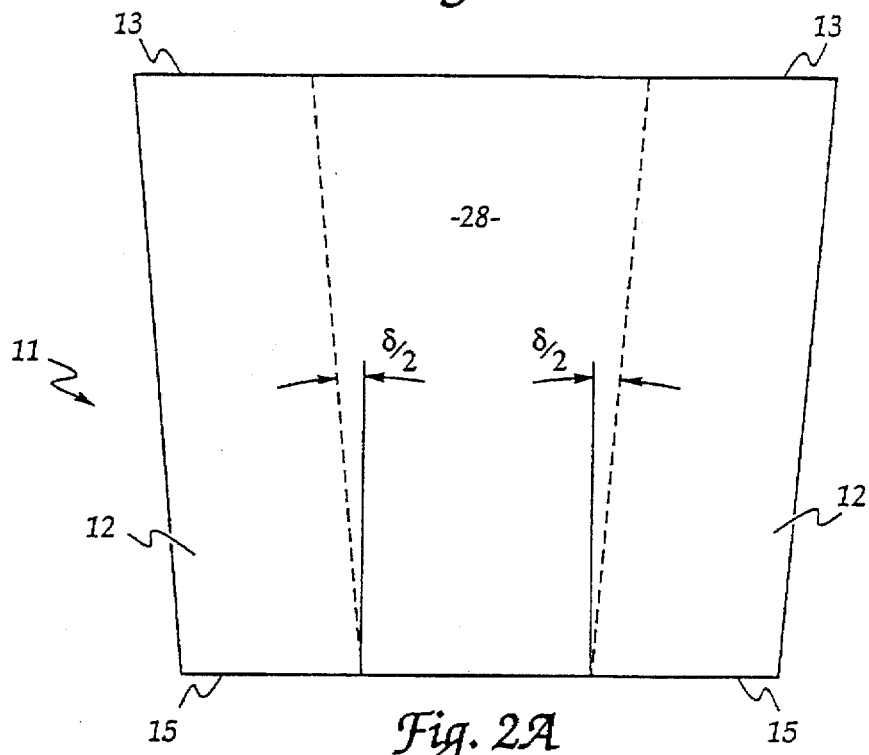
Figure 2C:
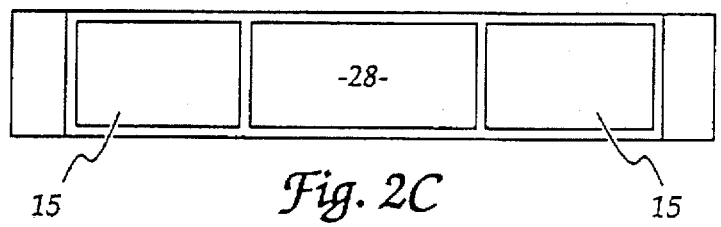
Figure 2D:
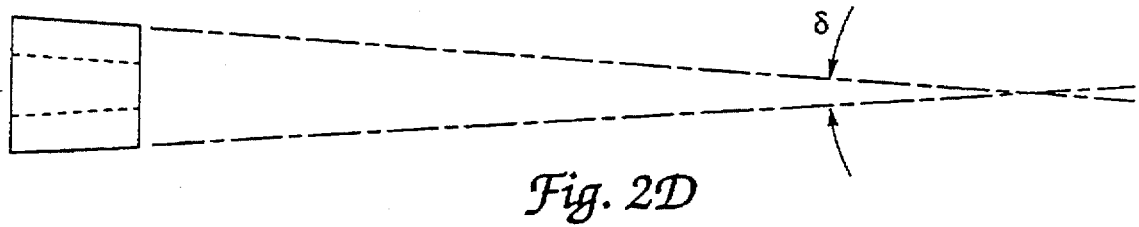

Referring to FIGS. 1 and 2A–2D, the viewing assembly 11 includes two tubes 12 which include apertures at either end which constitute the exit pupils 13 and entrance pupils 15 of the assembly. The tubes 12 have a length "x" of approximately 75 mm and converge at an angle of convergence of approximately 5°20'. The angle of convergence is angle "δ" as illustrated in FIGS. 2A and 2D. If the tubes are themselves tapered, the angle of convergence is defined by the angle at which the outer walls converge, ie the outer walls should converge at the desired angle.

The exit pupils 13 are separated by an interpupillary distance "y" of approximately 60 mm which is equivalent to the interpupillary distance of the wearer. Both the exit pupils 13 and the entrance pupils 15 are of the same rectangular shape which is substantially proportional to the shape of many two-dimensional objects which can be viewed. It should be noted that suitably scaled dimensions facilitate the use of the invention by children.

The viewing assembly 11 additionally includes an attachment means 14 which is in the form of regular spectacles or glasses. This allows the viewer to position the viewing assembly of the present invention in front of the eyes with ease and to maintain its position with minimal effort.

Figure 3:
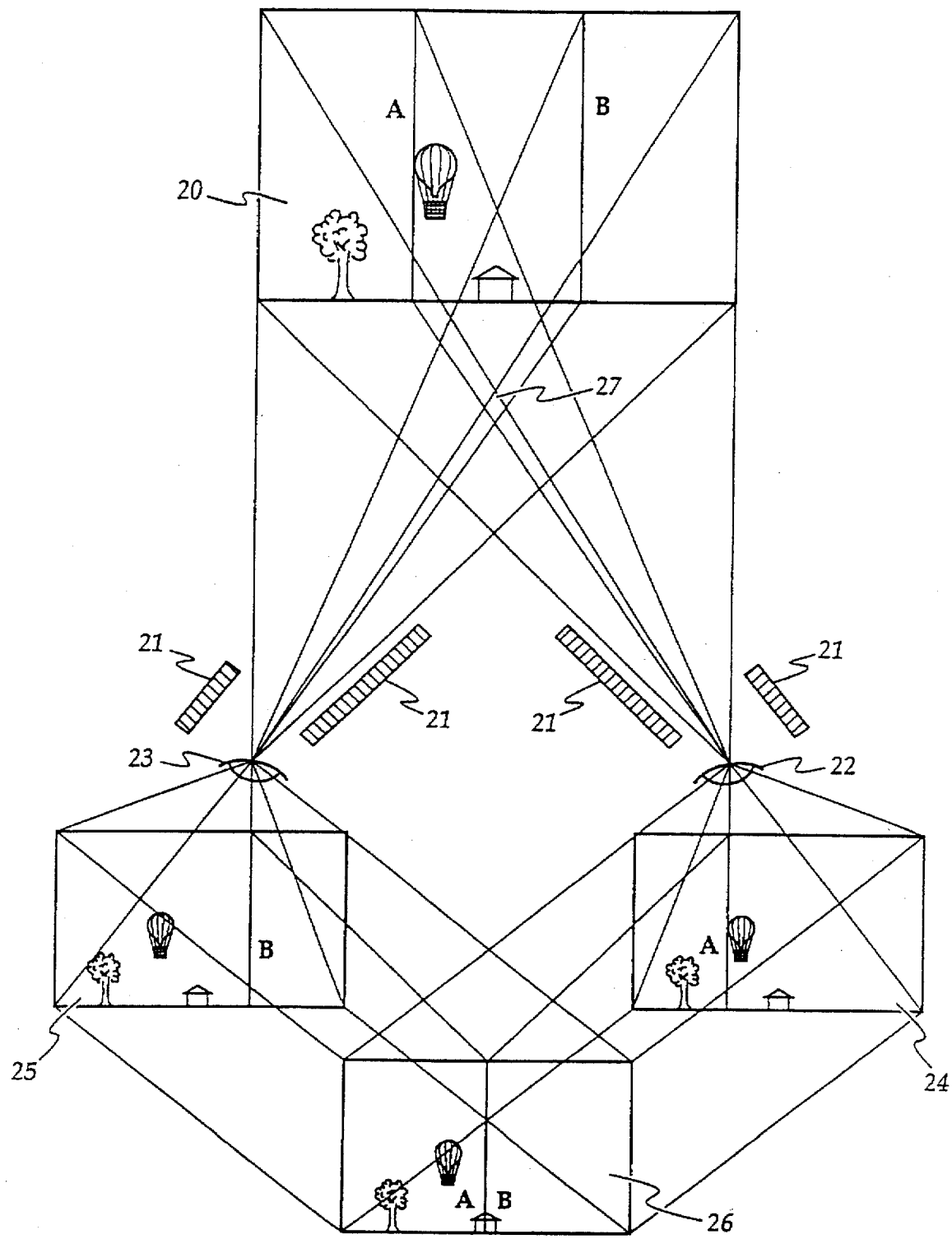
FIG. 3 is a ray diagram which illustrates the principles of operation of the viewing assembly.

The basic principle of operation of the viewing assembly will now be described with reference to FIG. 3. The vision directing means 21 of the assembly are positioned in front of the eyes 22 and 23. This causes the lines of sight of the eyes to cross at the location 27 and thus the focal point of the viewer is located in front of the two-dimensional object 20. The right eye 22 is directed to view approximately the left two thirds of the two-dimensional object 20 to produce a slightly oblique image 24 on the retina which is to the left of the normal line of sight, whereas the left eye 23 is directed to view approximately the right two thirds to produce a slightly oblique image 25 which is to the right of the normal line of sight. The two images 24 and 25 are believed to be interpreted by the brain to form a final image 26 which exhibits the illusion of depth or three dimensions.

Figure 4:
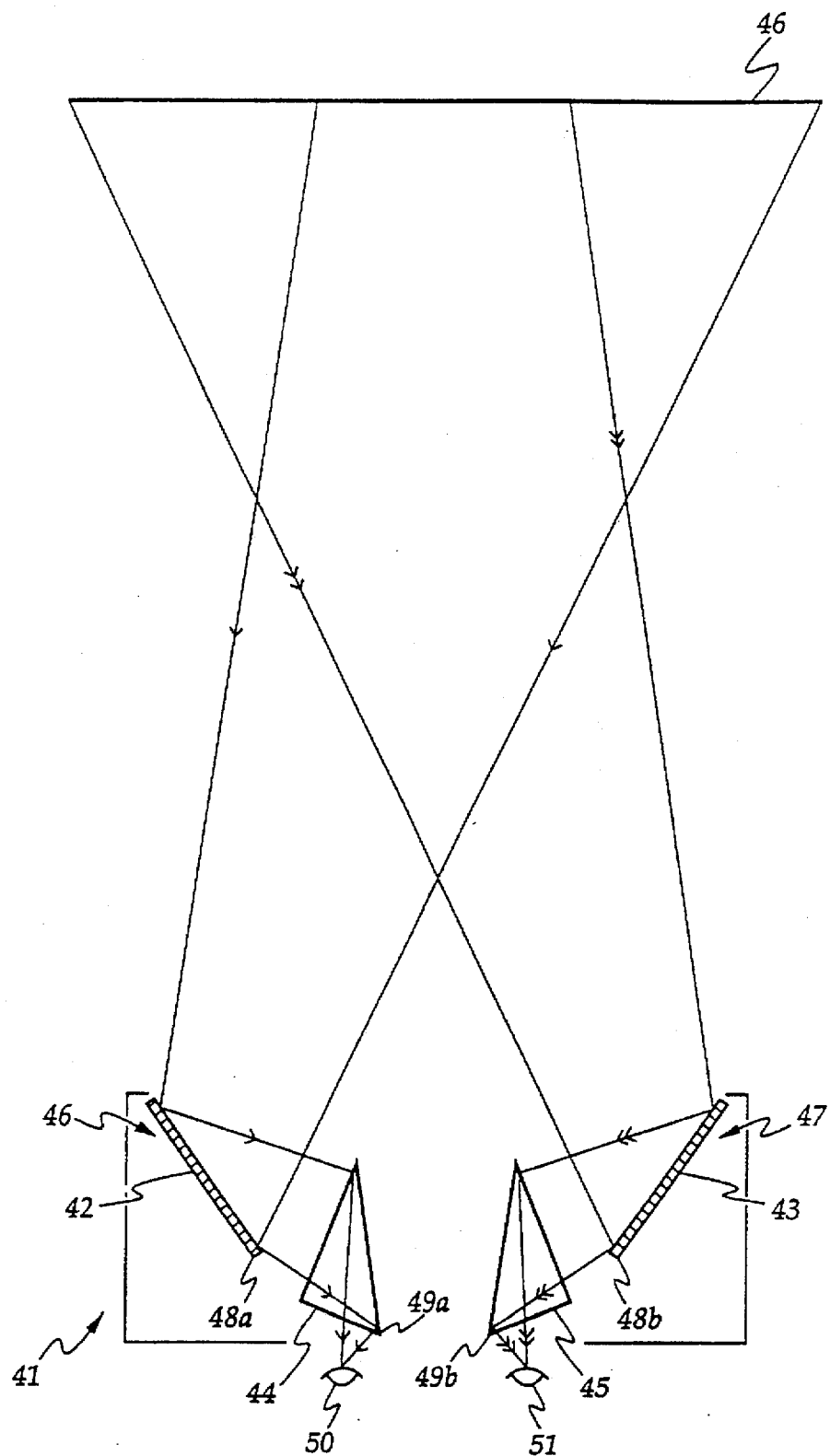
FIG. 4 is a ray diagram which illustrates the principles of operation of an alternate embodiment of the viewing assembly in which the vision directing means is an optical system.

Referring to FIG. 4, viewing assembly 41 includes optical systems 46 and 47 for viewing through the left and right eyes 50 and 51 respectively. Each of optical systems 46 an 47 includes a prism 44, 45 and a mirror 42, 43. Both mirrors 42, 43 are mounted to permit rotation about an axis transverse to the line of sight of the viewer. Rotation may be by pivotal movement about pivotally mounted ends 48a and 48b. Similarly, prisms 44 and 45 may be mounted to permit rotation about an axis. Preferably rotation is about pivotally mounted ends 49a and 49b.

In this embodiment, images are received by mirrors 42, 43 and reflected into prisms 44 and 45 respectively. The images are then transmitted through prisms 44 and 45 to the eyes of a user of the viewing apparatus.

Figure 5:
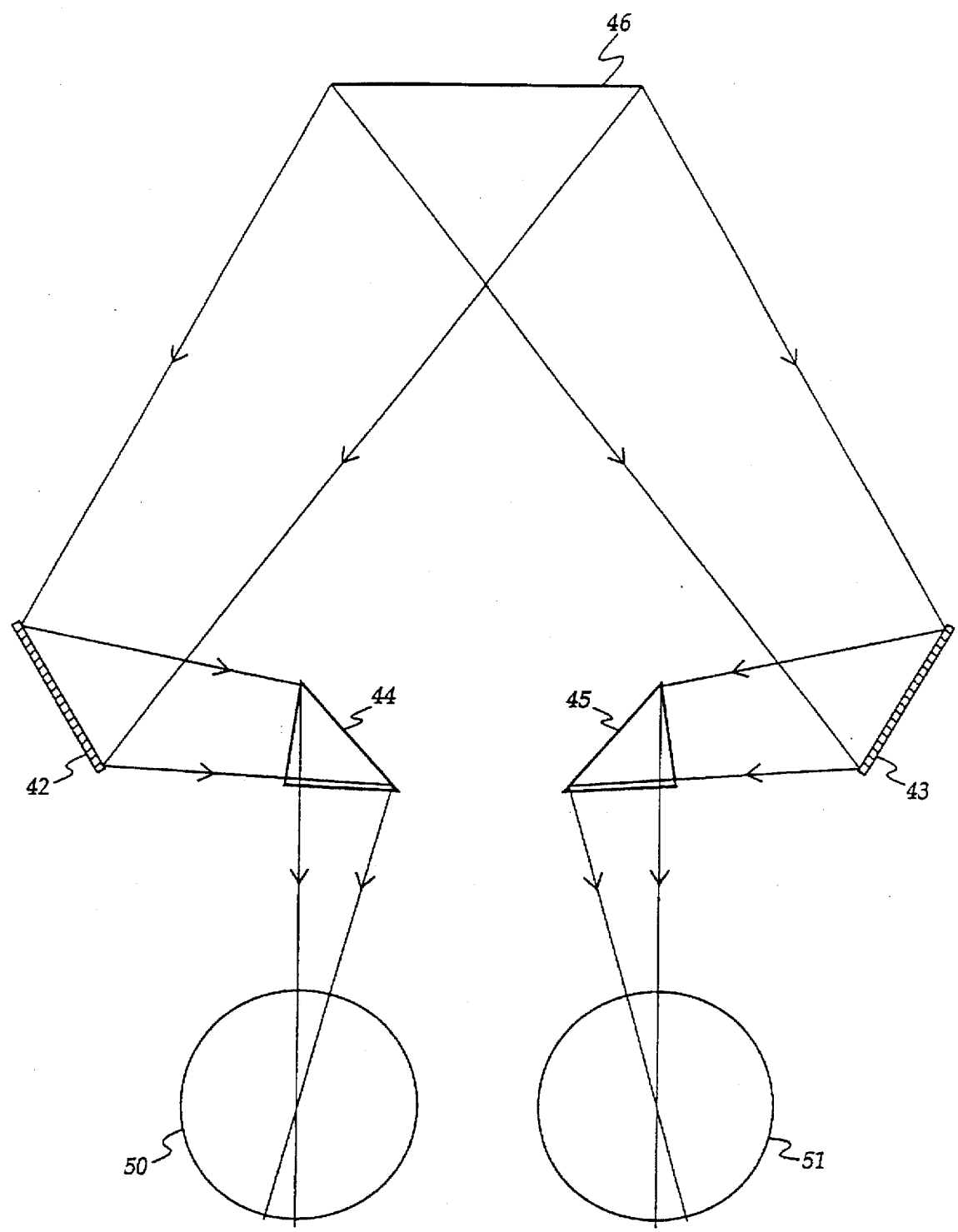
FIGS. 5 and 6 are ray diagrams illustrating the optical system seen in FIG. 4 for orthoscopic viewing and pseudoscopic viewing respectively.
Figure 6:
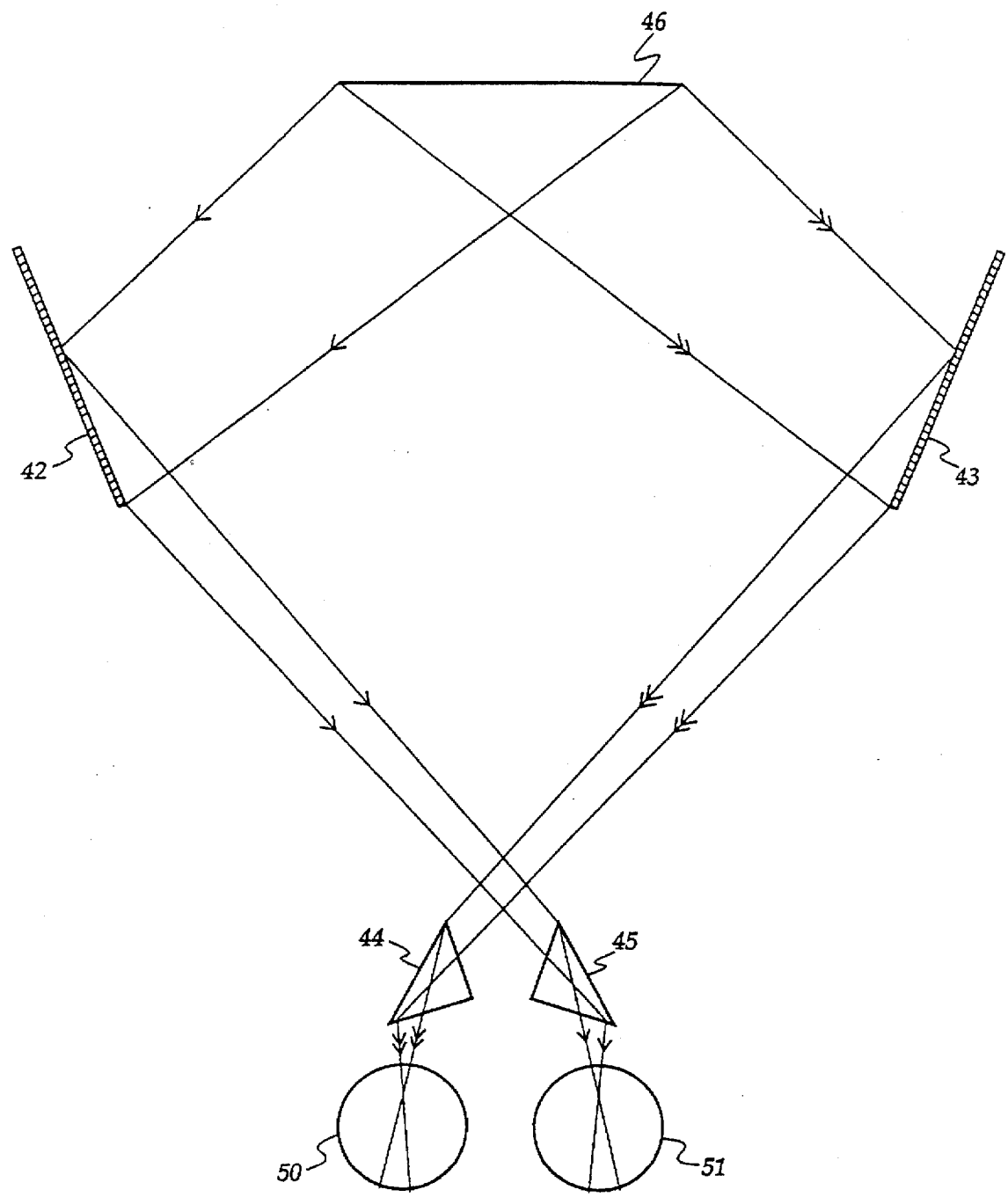

FIGS. 5 and 6 illustrate the system of FIG. 4 for orthoscopic and pseudoscopic viewing respectively. As seen in FIG. 6, pseudoscopic viewing wherein a model is turned "inside-out" in that details which seem closest in normal orthoscopic viewing now appear to be furthest away and vice versa, can be achieved by reversing the parallaxes by reversing the ray path between the eyes.

In use, the viewing assembly of the present invention is placed in front of the viewer's eyes. The vision directing means of the assembly guide the eyes so that the lines of sight cross over before the object, thus forming two retinal images which are shifted from the normal line of sight. This effect can be described as an expanding parallax shift. It is thought that the brain, finding these images illogical, interprets them by super-position thereby creating the illusion of depth.

It is also apparent that continued use of the viewing assembly "trains" the brain to interpret the images, and therefore over time the brain becomes more efficient in this respect. Thus when first used a user may not "see" the three-dimensional effect for some time.

It has also been surprisingly found that use of the viewing assembly in accordance with the invention produces an ocular therapeutic effect. When the viewing assembly is used periodically, it has been found that both the long and short eyesight of a user can be improved.

The vision of a fifty-five year old person was measured at R-180, L-180 with short distance Adj 175 and visual acuity R-6/6 and L-6/6. Six months later, after using the viewing apparatus of the present invention for a concentrated one week period involving regular daily viewing for periods totalling approximately three hours per day, the same person's vision was measured at R-180, L-180 with short distance Adj 150. After a further four months following further viewing exercises using the viewing assembly of the present invention visual acuity had improved to R-6/4 and L-6/4. After further therapy, some thirteen months later the person's vision was measured as L-180, R-180 with short distance adjustment improved further to Adj 100. Colour sensitivity also improved.

The mechanism by which this occurs is not fully understood but it is thought that this ocular therapeutic effect may be due to the brain adapting to interpret the images produced by the assembly and that this has the effect of "training" the brain to better coordinate images "seen" by the unassisted eye and thereby improve unassisted vision.

It will be understood that a stereopsis-like effect is produced by the viewing assembly of the present invention without the requirement of producing two physical images of the object and providing a form of optical apparatus which optically superimposes these images for viewing by a user.

The viewing assembly of the present invention does not require any form of lens in the first aspect as described and may be worn over a regular pair of spectacles or glasses. The image produced by the assembly is clear end undistorted and the original two-dimensional object requires no modification such as that seen to produce a stereoscopic effect in the manner of the prior art. The present invention differs from stereopsis in that the three-dimensional image is seen as depth receding back from the surface of the two-dimensional object, whereas stereopsis creates the illusion of the third dimension extending outward from the surface.

The viewing assembly may be used with respect to two-dimensional objects including, but not limited to television, photographs, paintings, slides and films. The areas of application of the assembly are also not limited, areas of use conceivably including the educational, medical, telecommunications, surveying and many industrial fields.

It will of course be realized that the viewing assembly of the present invention may also be used to view three-dimensional objects if so desired and that whilst the above has been given by way of an illustrative example of this invention, all such and other modifications and variations hereto, as would be apparent to persons skilled in the art, are deemed to fall within the broad scope and ambit of this invention as is hereinafter claimed.

I claim:

1. A viewing assembly for viewing a two dimensional object in three dimensions, said two dimensional object being divisible into predetermined segments and said viewing assembly including:

selectively variable vision directing means for converging the lines of sight of a user of said viewing assembly to direct the sight of each eye of said user to said predetermined segments of an object being viewed, said predetermined segments being laterally spaced and partially overlapping, the angle of convergence of the lines of sight being such that the lines of sight of each eye intersect at a point between the eyes and said object whereby a left-side segment of said object is viewed by the right eye and a right-side segment of said object is viewed by the left eye;

wherein said selectively variable vision directing means includes an optical system for each eye, each said optical system having an entrance pupil and an exit pupil and a prism proximate to the exit pupil thereof and a mirror proximate to the entrance pupil thereof, said prisms and said mirrors being rotatable about axes transverse to the line of sight of said user to selectively vary said angle of convergence.

2. A viewing assembly as claimed in claim 1, wherein said predetermined segments constitute substantially two thirds of the object whereby the segments seen by the eyes overlap in substantially the middle third of the object.

3. A viewing assembly as claimed in claim 2, wherein the entrance and exit apertures of said optical systems respectively constitute said entrance and exit pupils of said viewing assembly.

4. A viewing assembly as claimed in claim 3, wherein said entrance and exit apertures are shaped proportionately to the shape of the two-dimensional object being viewed.

5. A viewing assembly as claimed in claim 4, wherein the shape of said entrance and exit pupils is substantially rectangular.

6. A viewing assembly claimed in claim 3, wherein said exit pupils are separated by a distance equal to the interpupillary distance of said user.

7. A viewing assembly as claimed in claim 6, and including adjustment means for adjusting the interpupillary distance between said exit pupils.

8. A viewing assembly as claimed in claim 1, and including positioning means for positioning said viewing assembly in the correct position relative to the eyes of said user.

* * * * *